Feb. 5, 1952  M. A. THRALLS  2,584,401
TRANSPARENT VACUUM BACK
Filed Aug. 11, 1949
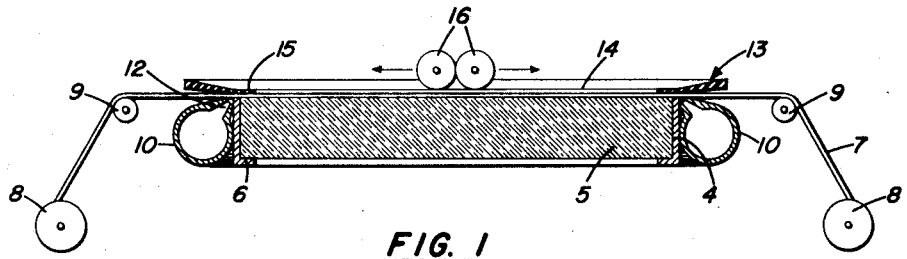
FIG. 1
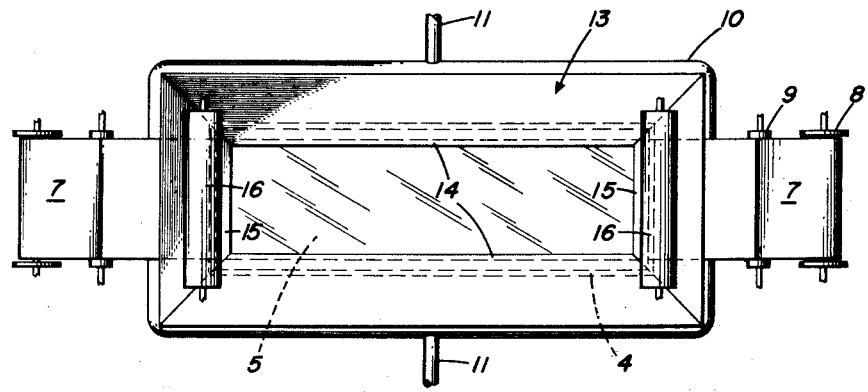
FIG. 2
Inventor
MARVIN A. THRALLS
By
Attorney Patented Feb. 5, 1952

2,584,401

UNITED STATES PATENT OFFICE 2,584,401

TRANSPARENT VACUUM BACK

Marvin A. Thralls, Kingston, N. J., assignor, by mesne assignments, to the United States of America as represented by the Secretary of the Navy Application August 11, 1949, Serial No. 109,768

2 Claims. (Cl. 88—24)

This invention relates to means for holding a photographic negative in flush surface contact with a plate. The negative may be a roll of film, a simple flexible sheet or a plate.

More particularly, the present invention is concerned with the use of a transparent, or translucent or opaque backing plate for the negative, mounted so that light may be transmitted through both the plate and the negative, or only to the negative either for the purpose of enlarging an image or for viewing the image, or for other purposes; and it is the primary object of the invention to devise a novel suction arrangement for producing a partial vacuum between the negative and the plate to more positively exhaust all air therefrom, thus to obtain full control therebetween.

A further object of the invention resides in the provision of a flexible framework substantially surrounding the plate and operable to assist in smoothening the negative against the latter and sealing the space therebetween against external atmospheric pressure.

It is another object to provide an ironing device, preferably in the form of an elastically deformable roll or a pair of such rolls, for assisting the suction means in creating a vacuum between a negative or an unwound strip of a roll of film and a plate.

The foregoing and other objects of the invention should clearly appear from a study of the following description when taken in conjunction with the accompanying drawing, wherein:

Fig. 1 is a side elevational view, largely in longitudinal section of a preferred embodiment of the present invention; and Fig. 2 is a plan view of the apparatus of Fig. 1, with the smoothing rollers moved to another position.

With continued reference to the drawing, the numeral 4 represents a rectangular frame or ring in which is mounted a backing plate 5 of transparent or translucent glass. This plate may obviously be made of any other suitable smooth light-transmitting or opaque backing material. The mounting may be accomplished by a tight fit or by cementing and the frame may be made of more than one piece, it being essential only that its front edges are smooth and substantially flush with the plate. The unit of course may be shaped other than rectangularly. A flange 6 on the frame in the illustrated device assists in assembling the elements properly and in holding the plate, and is narrow so as not to obstruct the transmission of light through the plate.

Any suitable supporting means (not shown) will be provided for the frame 4 to position it, for example, between the light source and the sensitized element of an enlarging camera. Also suitably mounted in the supporting structure are a pair of reels 8 and a pair of guiding rolls 9 over which is passed a strip of film 7 in such manner that any selected portion of the film may be drawn across the front of the plate 5. As previously stated, a simple negative in the form of a sheet or plate may be substituted for the film and the disposed in front of the plate 5.

A manifold 10, having connections 11 to a source of suction (not shown), surrounds at least a portion but preferably the whole of the frame 4. This manifold is shaped as shown to afford a smooth narrow protuberance in the form of a continuous ring that extends around the upper edges of the outer walls of the frame 4. The protuberance has either a multiplicity of apertures or a continuous slit 12, for sucking in air and thus creating a partial vacuum between the film and the backing plate 5, in this manner causing the film to be properly smoothed down in full contact against the plate. The purpose, of course, is to obtain accuracy of detail in the view or the reproduction of the negative, by bringing it precisely into the field of the focus as established by the surface of the backing plate.

To facilitate the creation and maintenance of the vacuum, a set 13 of flexible members may be provided. They may be formed individually, or in one piece like a picture frame, as shown, and preferably are of elastic rubber, neoprene or the like. They are mounted and held in any suitable manner so that their inner lip portions 14, 15 press lightly upon the film 7 and thus urge it against the plate 5.

For facilitation of creation of the initial vacuum there may be provided a pair of resilient rollers 16 that can ride to and fro upon the film, and upon the edges of the lips 14, the shafts of these rollers being pressed towards the plate 5 by springs (not shown). Initially the rollers are disposed as shown in Fig. 1, and thereafter, upon creation of suction, are rolled away from each other to rest upon the lips 15 as in Fig. 2. The rollers thus perform a smoothing or ironing action. After the negative or strip has been used, the rollers are returned to their original position and may be held slightly raised. Means may be provided to blow air through the manifold 10 momentarily to facilitate removal of the negative or movement of the film to expose a fresh strip.

The operation of the apparatus should be obvious from the foregoing running description.

Obviously many modifications and variations of the present invention are possible in the light of the above teachings. It is therefore to be understood that within the scope of the appended claims the invention may be practiced otherwise than as specifically described.

What is claimed is:

1. Apparatus of the class described, comprising a substantially rectangular fixed plate, a set of guide rolls disposed to convey a strip of film past the front face of the plate in parallelism and in slightly spaced relation therewith, a suction manifold surrounding the plate and having its inner edge provided with means for bleeding air to or from between the film and the plate, a rectangular deformable sealing frame having inner edges which overlie the strip of film and the plate and an outer portion spaced above and overlying the edges of the plate and suction manifold, and means for smoothing said frame over said strip so that its said outer portion flexed against said strip over the plate and manifold, providing a full contact between said strip and plate.

2. A device of the class described for use in photographic work and comprising, a rigid backing plate, means for smoothing a negative against said plate, said smoothing means including a manifold ring surrounding said plate and having a perforated or slit protuberance extending around the edges of the plate, said manifold ring being in communication with a suction means to create a pressure lower than atmospheric under the negative and to help in removing any air that might tend to remain between the negative and the plate, said smoothing means also including a frame which has a set of resilient lip members flexed toward and overlying the edges of the plate and also overlying the perforations or slit of the manifold to provide a seal during use of the device.

MARVIN A. THRALLS.

REFERENCES CITED

The following references are of record in the file of this patent:

UNITED STATES PATENTS

| Number | Name | Date |
|---|---|---|
| 601,883 | Schwarz | Apr. 5, 1898 |
| 679,740 | Gerlach | Aug. 6, 1901 |
| 2,122,474 | Karl | July 5, 1938 |
| 2,408,310 | Hassler | Sept. 24, 1946 |